United States Patent
Chamberlain et al.

(10) Patent No.: US 9,542,299 B2
(45) Date of Patent: Jan. 10, 2017

(54) PROCESSING CORE DATA PRODUCED BY A COMPUTER PROCESS

(71) Applicant: GLOBALFOUNDRIES INC., Grand Cayman (KY)

(72) Inventors: Richard N. Chamberlain, Hursley (GB); Howard J. Hellyer, Hursley (GB); Matthew F. Peters, Hursley (GB); Adam J. Pilkington, Hursley (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 410 days.

(21) Appl. No.: 14/045,007

(22) Filed: Oct. 3, 2013

(65) Prior Publication Data
US 2015/0100834 A1    Apr. 9, 2015

(30) Foreign Application Priority Data

Oct. 3, 2012    (GB) .................................... 1217667.3

(51) Int. Cl.
G06F 11/36    (2006.01)
G06F 11/07    (2006.01)
G06F 11/34    (2006.01)

(52) U.S. Cl.
CPC ....... *G06F 11/3636* (2013.01); *G06F 11/0715* (2013.01); *G06F 11/0778* (2013.01); *G06F 11/3471* (2013.01)

(58) Field of Classification Search
CPC .......................... G06F 11/3636; G06F 11/3466
See application file for complete search history.

(56) References Cited

U.S. PATENT DOCUMENTS

| | | | |
|---|---|---|---|
| 6,223,761 B1 | 5/2001 | Najmolhoda et al. | |
| 6,314,530 B1 * | 11/2001 | Mann | G06F 11/348 714/25 |
| 6,578,160 B1 * | 6/2003 | MacHardy, Jr. | G06F 11/0709 709/223 |
| 6,681,348 B1 | 1/2004 | Vachon | |

(Continued)

FOREIGN PATENT DOCUMENTS

| | | | | |
|---|---|---|---|---|
| GB | 2506614 A * | 4/2014 | | G06F 11/3471 |
| JP | 2009205254 A | 9/2009 | | |
| WO | WO2006123351 A1 | 11/2006 | | |

OTHER PUBLICATIONS

Intellectual Property Office Search Report dated Mar. 5, 2013, regarding Application No. GB1217667.3, 4 pages.

(Continued)

*Primary Examiner* — Loan L. T. Truong
(74) *Attorney, Agent, or Firm* — Thomson Hine LLP

(57) ABSTRACT

A method, apparatus, computer program and computer program product for processing core data produced by a computer process to identify data relevant to the computer process, the method comprising the steps of: identifying core data for a computer process; identifying trace data comprising sequential trace entries for the computer process; selecting a predetermined number of most recent entries in the trace data; identifying any references to a memory address in each selected trace data entry; dereferencing each identified memory address in the core data; and extracting the data from the dereferenced memory location in the core data.

26 Claims, 4 Drawing Sheets

(56) References Cited

U.S. PATENT DOCUMENTS

| | | | | |
|---|---|---|---|---|
| 6,732,307 B1* | 5/2004 | Edwards | G06F 11/3636 | 714/45 |
| 7,444,319 B1* | 10/2008 | Sathyanarayan | G06F 17/30867 | |
| 7,506,314 B2* | 3/2009 | Kollmann | G06F 11/3476 | 714/45 |
| 7,783,932 B1 | 8/2010 | Eigen et al. | | |
| 7,827,446 B2* | 11/2010 | Kimura | G06F 11/0709 | 714/26 |
| 8,042,007 B1* | 10/2011 | Chan | G06F 11/3636 | 714/45 |
| 8,606,825 B1* | 12/2013 | Matthews | G06F 17/24 | 707/803 |
| 8,997,057 B1* | 3/2015 | Diwan | G06F 7/36 | 717/124 |
| 9,213,841 B2* | 12/2015 | Hiar | G06F 11/366 | |
| 2004/0143594 A1* | 7/2004 | Kalies | G06F 19/363 | |
| 2006/0245365 A1* | 11/2006 | Monk | H04L 41/145 | 370/241 |
| 2007/0162895 A1* | 7/2007 | Altman | G06F 9/3844 | 717/128 |
| 2007/0294682 A1* | 12/2007 | Demetriou | G06F 8/45 | 717/153 |
| 2008/0005627 A1* | 1/2008 | DeCenzo | G06F 11/0727 | 714/48 |
| 2008/0208927 A1* | 8/2008 | Chikusa | G06F 3/0605 | |
| 2009/0106363 A1* | 4/2009 | Fallen | G06F 11/0748 | 709/204 |
| 2009/0216967 A1 | 8/2009 | Sugawara | | |
| 2010/0042977 A1* | 2/2010 | Chinchalkar | G06F 11/3636 | 717/128 |
| 2010/0107017 A1* | 4/2010 | Munjal | G06F 11/0715 | 714/49 |
| 2011/0154296 A1* | 6/2011 | Marenco | G06F 11/3636 | 717/128 |
| 2011/0231691 A1* | 9/2011 | Horley | G06F 9/545 | 713/375 |
| 2012/0124428 A1* | 5/2012 | Zeng | G06F 11/3476 | 714/45 |
| 2012/0166483 A1* | 6/2012 | Choudhary | G06F 17/30545 | 707/770 |
| 2013/0061210 A1* | 3/2013 | Chung | G06F 11/3664 | 717/125 |
| 2013/0097405 A1* | 4/2013 | Thorvaldsson | G06F 12/02 | 711/216 |
| 2013/0132699 A1* | 5/2013 | Vaishampayan | G06F 11/073 | 711/170 |
| 2014/0101141 A1* | 4/2014 | Takami | G06F 17/30973 | 707/722 |

OTHER PUBLICATIONS

Gao et al., "Path Grammar Guided Trace Compression and Trace Approximation," 15th IEEE International Symposium on High Performance Distributed Computing, Jun. 2006, pp. 57-68.

Grekhov et al., "On Reducing of Core Dump File Size," Proceedings of IEEE EUROCON 2009, May 2009, pp. 1291-1295.

* cited by examiner

PROCESSING CORE DATA PRODUCED BY A COMPUTER PROCESS

CROSS-REFERENCE TO RELATED APPLICATION

This Application claims the benefit of priority to United Kingdom Patent Application Serial No. 1217667.3, filed on Oct. 3, 2012, the contents of which are hereby incorporated by reference.

TECHNICAL FIELD

The present invention relates to processing core data produced by a computer process.

BACKGROUND ART

Computer systems commonly comprise functionality to cope with a program or process ceasing to operate appropriately which is generally referred to as the program or process crashing. Any type of program or process may crash such as an application program, system or utility program, operating system or virtual machine. In order to assist the diagnosis of a crash, the crashing program or the operating system on which the crashing program runs may be arranged to output a file comprising a copy of the data from the memory used by the crashing program. Such a file is commonly referred to as a core file or a core dump. Such core files commonly comprise a memory image, that is, a copy of the data from the processor registers and random access memory (RAM) occupied by the crashing program or process, which may be useful in the identification of the cause of the crash.

However, such core files may be large and require significant storage space. In addition, large core files require significant time and resource to create or move. For example, in some arrangements, the process memory space usage may exceed the amount of storage space or transmission bandwidth available. In this case, generating core files that are images of the memory may not be practical.

Therefore, there is a need in the art to address the aforementioned problem.

SUMMARY OF INVENTION

An embodiment of the invention provides a method for processing core data produced by a computer process to identify data relevant to the computer process, the method comprising the steps of: identifying core data for a computer process; identifying trace data comprising sequential trace entries for the computer process; selecting a predetermined number of most recent entries in the trace data; identifying any references to a memory address in each selected trace data entry; dereferencing each identified memory address in the core data; and extracting the data from the dereferenced memory location in the core data.

Embodiments of the invention enable the size of the core file data to be reduced. The most recent entries are selected from the trace file so as to enable the extraction the most relevant data to the process from the core data.

The most recent entries in the trace data may comprise a predetermined number of entries. Selecting a predetermined number of core data entries provides a simple mechanism for determining the most recent core data. If the data from any dereferenced memory location in the core data comprises a further reference to a memory address then the further memory address in the core data may be dereferenced; and the data from the dereferenced further memory location in the core data may be extracted. Dereferencing memory locations enables further potentially relevant data to be extracted from the core data. For a given trace entry the extraction of referenced data may be limited to a predetermined depth of reference. Limiting the depth of dereferencing of referenced memory addresses reduces less relevant or dependable data being extracted from the core data. The extracted data may comprise a data structure. Each reference to a memory address may comprise a pointer.

The method may comprise the steps of: identifying entries in the core data comprising register data for the process; identifying any references to a memory address in each selected register entry; dereferencing each identified register data memory address in the core data; and extracting the data from the dereferenced register data memory location in the core data. The data in the image of the registers is likely to reference the most recent data in the core data.

The extracted data may be marked within the core data file. Remaining data in the core data file excluding the extracted data may be replaced with compressible data. The extracted data may be copied from the core data file into one or more other files.

The computer process may be a system or application program and the method comprises the steps of: translating references to a memory address in the trace data for program to the core data address space so as to enable the steps of: identifying any references to a memory address in each selected trace data entry; dereferencing each identified memory address in the core data; and extracting the data from the dereferenced memory location in the core data The computer process may be a virtual machine.

Another embodiment provides apparatus for processing core data produced by a computer process to identify data relevant to the computer process, the apparatus being operable to: identify core data for a computer process; identify trace data comprising sequential trace entries for the computer process; select a predetermined number of most recent entries in the trace data; identify any references to a memory address in each selected trace data entry; dereference each identified memory address in the core data; and extract the data from the dereferenced memory location in the core data.

A further embodiment provides a computer program stored on a computer readable medium and loadable into the internal memory of a digital computer, comprising software code portions, when said program is run on a computer, for performing a method for processing core data produced by a computer process to identify data relevant to the computer process, the method comprising the steps of: identifying core data for a computer process; identifying trace data comprising sequential trace entries for the computer process; selecting a predetermined number of most recent entries in the trace data; identifying any references to a memory address in each selected trace data entry; dereferencing each identified memory address in the core data; and extracting the data from the dereferenced memory location in the core data.

Viewed from a further aspect, the present invention provides a computer program product for processing core data produced by a computer process to identify data relevant to the computer process, the computer program product comprising: a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

Another embodiment provides a method or system substantially as described with reference to the figures.

BRIEF DESCRIPTION OF THE DRAWINGS

Preferred embodiments of the invention will now be described, by way of example only, with reference to the following drawings in which.

DETAILED DESCRIPTION OF THE EMBODIMENTS

Figure 1:
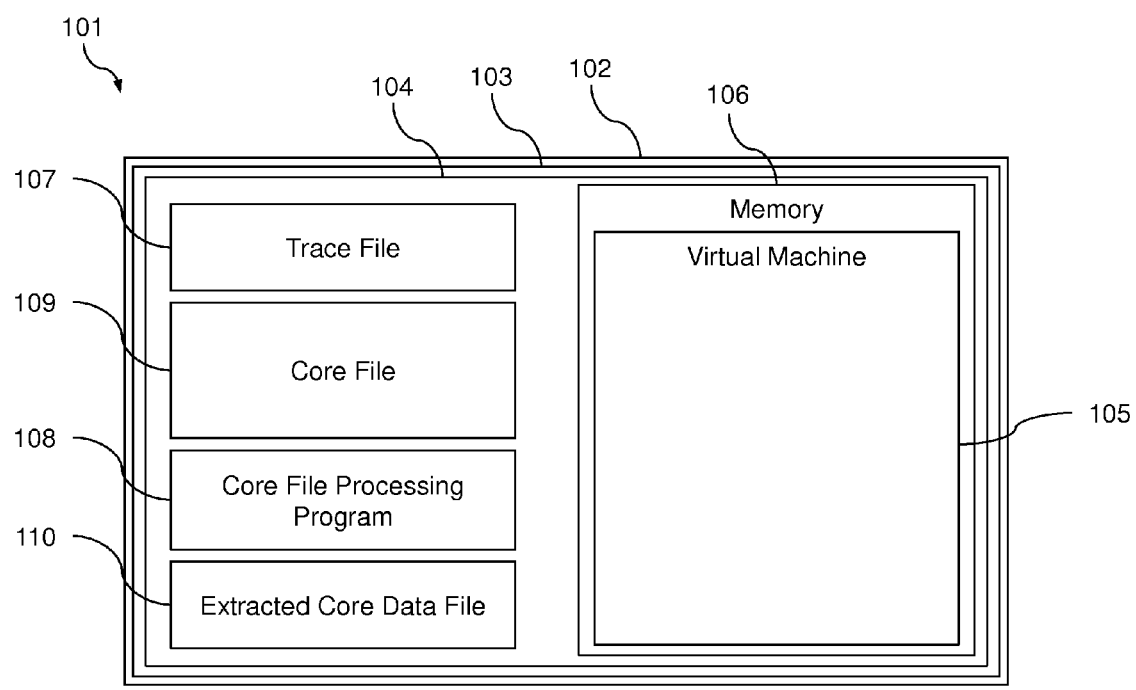
FIG. 1 is schematic illustration of a computer system running a process, according to a preferred embodiment of the present invention.

With reference to FIG. 1, a computer system 101 comprises a computer 102 running an operating system 103 arranged to provide a platform for one or more application programs. In the present embodiment, the computer is running a virtual machine environment (VME) application program 104 in the form of a Java™ Runtime Environment (JRE). The VME 104 is running a virtual machine (VM) 105, in the form of a Java™ virtual machine (JVM), in memory 106 provided by the JRE 104. Java and all Java-based trademarks and logos are trademarks or registered trademarks of Oracle and/or its affiliates.

The VM 105 is provided with trace code (not shown) arranged to output trace data, stored in a trace file 107, detailing the operations performed by the VM 105 during its operation. In the present embodiment, the VME 104 is provided with a core file processing program 108 arranged to operate in response to the VM 105 crashing. In such an event, the VM 105 outputs the trace file 107 and a core file 109 comprising an image of the memory 106. The core file processing program 108 is arranged to process the core file 109 in combination with the trace file 107 to extract selected core data, which is then stored by the VME 104 in an extracted core data file 110. The extracted core data file 110 comprises data extracted from the core file 109 in dependence on the data in the trace file 107. In the present embodiment, the core file processing program 108 is arranged to use the data in the trace file 107 to index the data in the core file 109 so as to extract the data from the core file 109 that was most recently referenced by the VM 105. In the present embodiment, the most recent referenced or used data is identified from a predetermined number of the most recent entries in the trace file 107 as described in further detail below.

Figure 2:
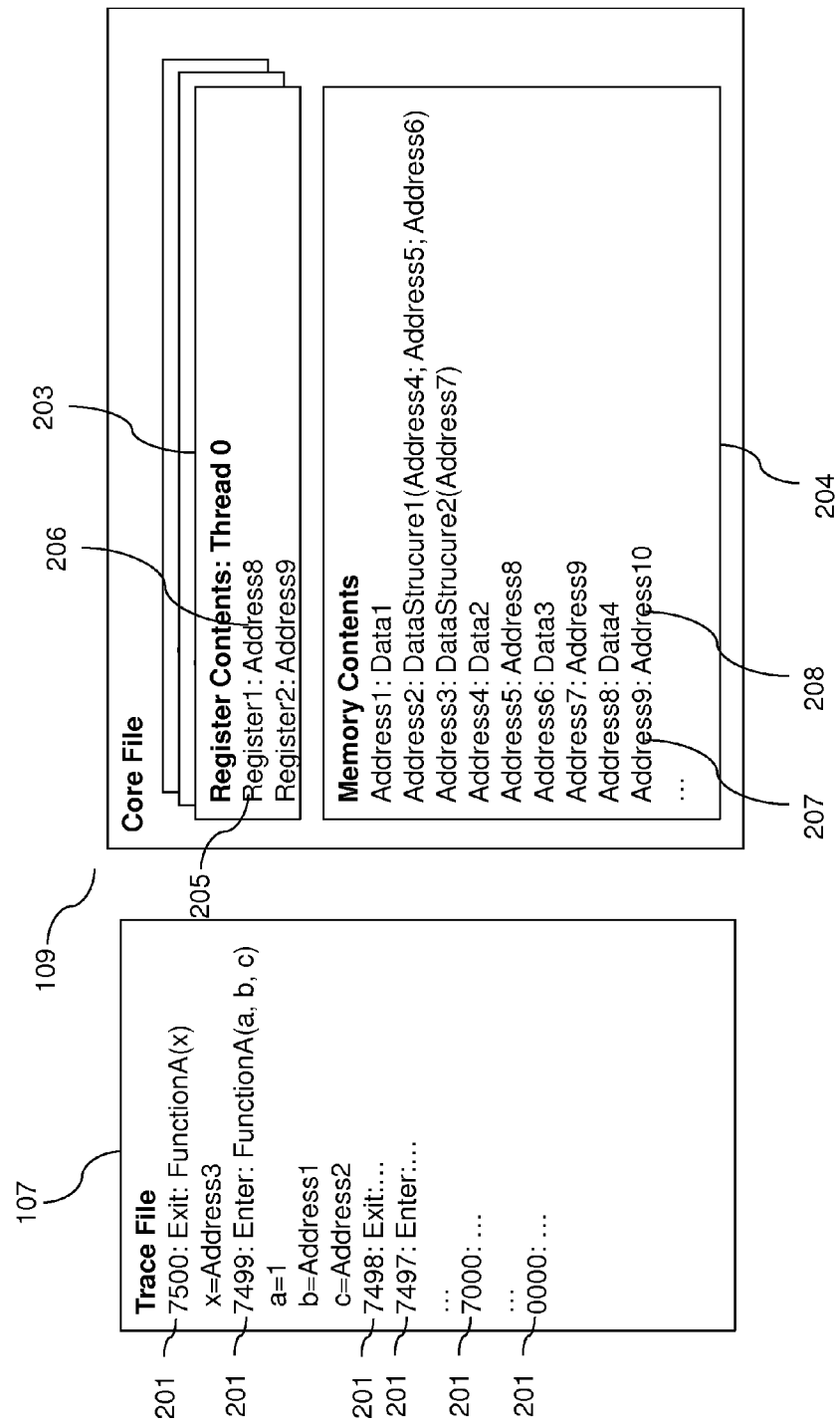
FIG. 2 is a diagrammatic representation of a trace file and a core file produced as a result of the process running in the computer system of FIG. 1, according to a preferred embodiment of the present invention.

With reference to FIG. 2, the trace file 107 comprises a sequence of entries 201 each describing an event in the processing of the VM 105 such as processing control passing into or out of a given function. Such functions may take one or more input parameters and output or return one or more parameters. One or more of the parameters in a given trace file entry 201 may comprise a reference to an address in the memory 106, in the form of a pointer. The target of such a reference or pointer may comprise data, a data structure or a further reference or pointer. In the present embodiment, the events 201 are sequentially numbered in order of their entry by the VM 105 in the trace file 107.

As noted above, the core file 109 comprises an image 204 of the memory 106, that is, a copy of the contents of the memory 106. In the present embodiment, the VM 105 performed multi-threaded processing. As such, the core file 109 further comprises respective register data image 203 for each such thread. Each register data image 203 comprises a set of register addresses 205 and the corresponding register contents 206 in the form of data, one or more data structures or one or more pointers. The memory image data 204 comprises a set of memory addresses 207 and corresponding data contents 208 in the form of data, one or more data structures or one or more pointers for all threads. Similarly, the trace file 107 comprises corresponding trace data for each thread.

Figure 3:
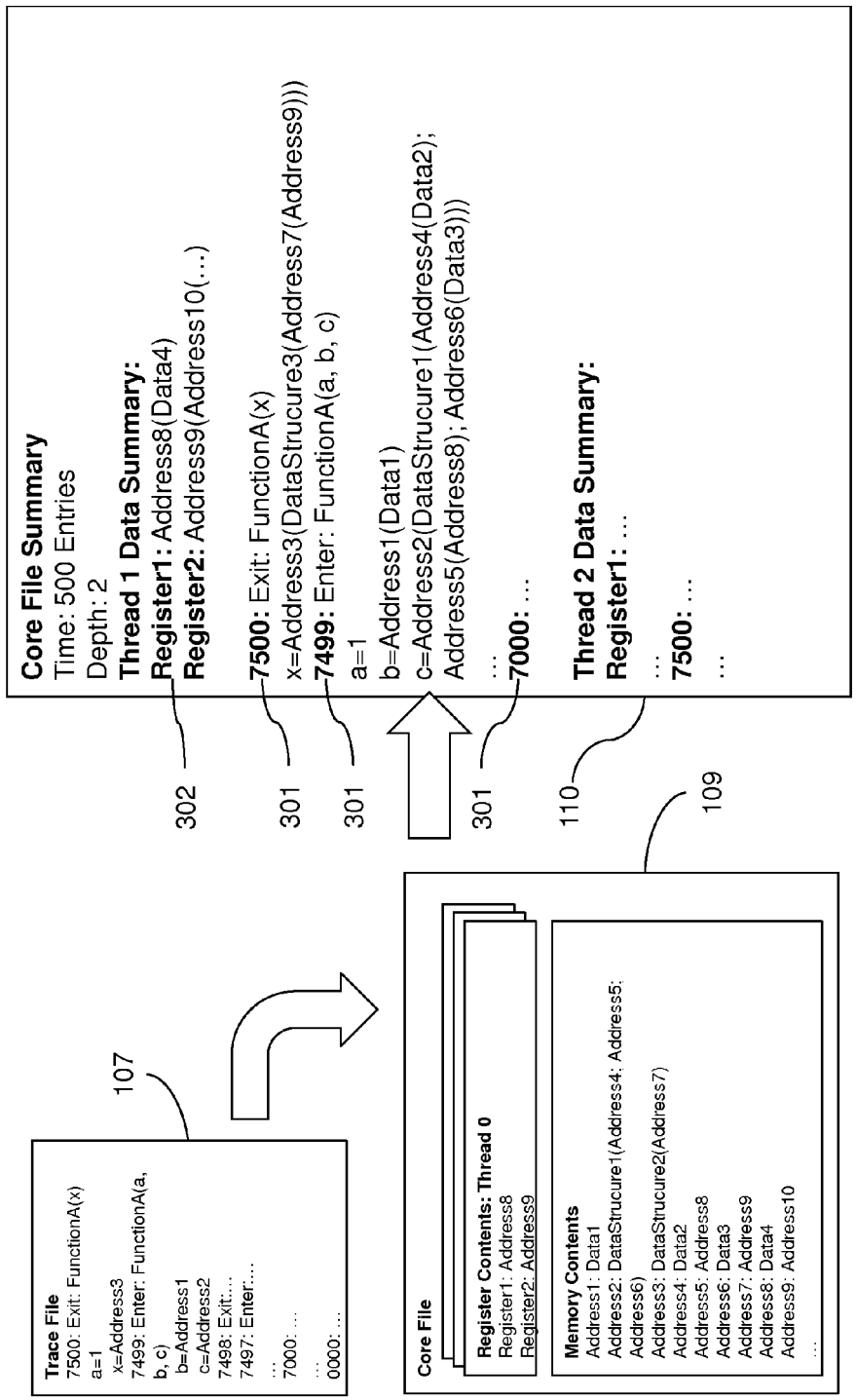
FIG. 3 is a diagrammatic representation of processing of the trace file and core file of FIG. 2 for identifying data in the core file relevant to the process, according to a preferred embodiment of the present invention.

With reference to FIG. 3, the core file processing program 108 is arranged to process the core file 109 using the trace file 107 to produce the extracted core data file 110. The extracted core data relates to a predetermined time period measured by a predetermined number of entries in the trace file 107. In the present embodiment, the period is determined by 500 trace file entries for each thread. Furthermore, the depth to which data is extracted from the core file 109 is limited to a predetermined number of pointer dereferences. In the present embodiment, the depth is set to two, that is, two sequential pointers can be dereferenced and the corresponding data, data, one or more data structures or one or more further pointers is extracted into the extracted core data file 110.

Returning to FIG. 2 and referring to the example data, the core file processing program 108 takes each entry 201 in the trace file in turn starting with the most recent entry 7500:

7500:Exit:FunctionA(x)

Entry 7500 traces the thread control exiting the function "FunctionA" with a single return parameter in the form of a pointer as follows:

x=Address3

Dereferencing the pointer in memory image 204 in the core file 109 yields the following data structure comprising a single pointer:

Address3=DataStructure2(Address7)

Dereferencing the pointer results in a further pointer as follows:

Address7=Address9

Since the depth limit of two dereferencing steps for any given pointer has been met the processing of this entry 201 is complete and no further data is extracted by indexing the core file 109 via the entry 7500 of the trace file 107. The core file processing program 108 then takes the next most recent entry 7499 in the trace file 107 as follows:

7499: Enter: FunctionA(a, b, c)

Entry 7499 traces the relevant thread control entering the function "FunctionA" with three parameters detailed as:

a=1
b=Address1
c=Address2

The three parameters comprise respectively an item of data and two pointers.

Dereferencing the two pointers in the core file 109 yields the following:
Address1=Data1
Address2=DataStructure1(Address4, Address5, Address6)

The first pointer yields data a data item and the second pointer yields a data structure comprising an array of three further pointers. Dereferencing the array of pointers yields the following entries from the core file 109:
Address4=Data2
Address5=Address8
Address6=Data3

The first and third pointers yield data items while the second pointer yields a further pointer. Since the depth limit of two dereferencing steps for any given pointer has been met, no further data is extracted by indexing the core file 109 via the entry 7499 of the trace file 107.

With reference to FIG. 3, the identified data from the core file 109 that is identified or indexed in processing each of the predetermined number of entries in the trace file 107 comprises extracted core file data 301 and, in the present embodiment, is copied or extracted into the extracted core data file 110 for each thread.

In the present embodiment, once the core file processing program 108 has processed the predetermined number of trace file entries 201 for a given thread with respect to the memory image 204 of the core file, the core file processing program 108 is then arranged to process the register image data 203 for the given thread. For each register entry 205 the relevant data, one or more data structures or one or more pointers 206 are indexed in the memory image 204 and the yielded data copied to the extracted core data file 110. Any pointers are dereferenced to the predetermined depth limit as described above. In the present embodiment, the extracted register data 302 is placed in the extracted core date file 110 prior to the data extracted via the trace file 107 for a given thread.

Figure 4:
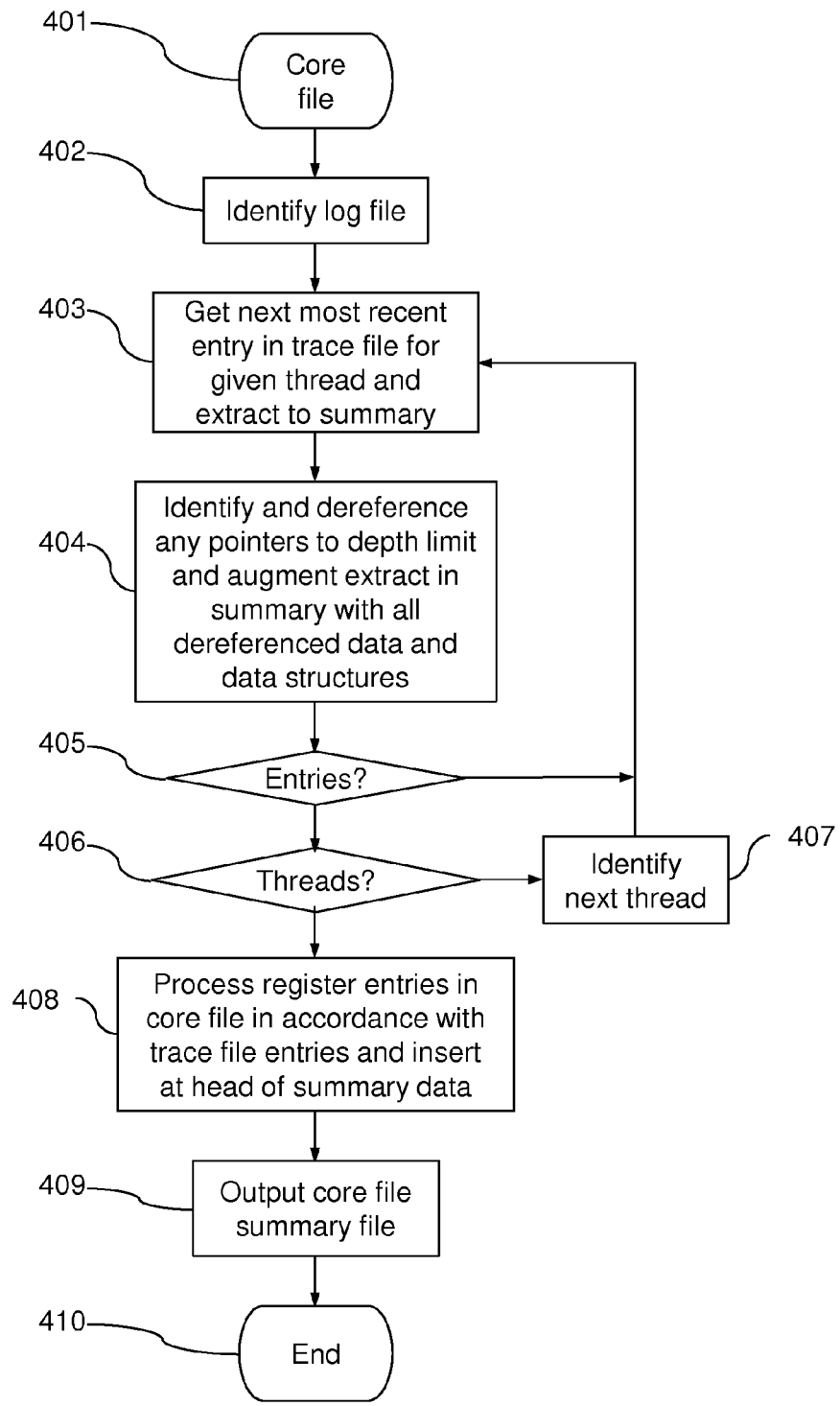
FIG. 4 is a flow chart illustrating processing performed in the computer system of FIG. 1 when processing of the trace file and core file as shown in FIG. 3, according to a preferred embodiment of the present invention.

The processing performed by the core file processing program 108 will now be described with reference to the flow chart of FIG. 4. Processing is initiated at step 401 in response to the crashing of the VM 105 and the production of the core file 110 and processing moves to step 402. At step 402 the trace file for the VM 105 is identified and processing moves to step 403. At step 403 the most recent entry in the trace file 107 is identified and extracted to the core data file 110 and processing moves to step 404. At step 404 any pointers in the trace entry are identified and dereferenced to the predetermined depth limit and the yielded data, data structures and further pointers copied into the extracted core data file 110 to augment the extracted trace file entry and processing then moves to step 405. At step 405 unless the predetermined number of entries in the trace file 107 for a given thread has been processed then processing returns to step 403 to select the next most recent entry in the trace file 107 and proceeds as described above. When, at step 405, the predetermined number of entries in the trace file 107 for a given thread have been processed, then processing moves to step 406. If at step 406 not all the threads in the trace file 107 have been processed, then processing moves to step 407. At step 407 the next thread is identified and logged in the extracted core data file 110. Processing then returns to step 403 and proceeds as described above to extract the data indexed by the relevant entries of the trace file 107 from the core file 109 for inclusion in the extracted core data file 110 for the next thread. At step 406, when all the threads have been processed, then processing moves to step 408. At step 408 the register entries in the core file 109 are identified for each relevant thread and each processed in the same manner as the trace file entries to extract the data, data structures and pointers, dereferencing any pointers to the predetermined depth, to identify the referenced data within the core file 109 and extract that data to the extracted core data file 110 for each thread. In the present embodiment, the extracted register data 302 is inserted in the extracted core data file 109 prior to the relevant trace file indexed data for any given thread. Processing then moves to step 409 where the extracted core data file 110 is output for use in diagnosing the cause of the crash of the VM 105. Processing then moves to step 410 and ends.

In another embodiment the core data is in memory and the indexing performed using the trace file data and extraction of core data into the extracted core data file is performed directly on the core data in memory In a further embodiment, the extracted core data comprises only core data referenced from register entries or contained therein. In another embodiment, the extracted core data excludes data referenced register entries or contained therein.

In a further embodiment, the extracted core data file comprises the original core data or a copy of the core data with the data indexed via the relevant trace file data entries highlighted or otherwise marked or indicated. In other words, the extraction of core file data comprises simply marking or highlighting the data without removing or copying it from its associated body of core file data. In another embodiment, the extracted core data file comprises a copy of the core data file with the surplus data, that is, the core data other than that data indexed via the relevant trace file data entries, replaced with dummy data arranged to be highly compressible.

Embodiments of the invention may be provided within a virtual machine for extracting selected core data on shut down of the crashed VM. Similarly, embodiments may be provided for use in physical operating system as a system program or utility or as an application program such as a forensic, recovery, development or other suitable application program. Embodiments of the invention may be provided within a physical application program itself.

In another embodiment, the program producing the trace and core data comprises a higher level program such as an application program running on the VM. In the present embodiment, the application program comprises the IBM® WebSphere® Application Server (WAS) running on a Java™ VM (JVM). Consequently, the trace data will be similarly high level. Therefore, in response to a crash of the application program, the JVM is arranged to translate the higher level data references of the application program trace data entries and core data memory locations. The WAS writes its own trace data that comprises entry and exit records for Java™ methods within WAS, as opposed to entry and exit to and from functions within the JVM. Just as the JVM trace entries may include pointers to the VM's data structures, the WAS trace may contain references to significant WAS objects on the Java™ heap. These trace entries will not contain memory addresses, but the JVM is arranged to translate the object references within the WAS trace into real addresses in the core file so as to enable the processing of the WAS trace by the core file processing functionality as describe above with reference to FIGS. 3 and 4 to produce the extracted core data for identification and diagnosis of the cause of a crash. The JVM is best placed to perform this translation of higher level trace data to the machine level trace data since the JVM comprises the correlations between the higher and lower level references or addresses references and can identify the layout of relevant objects within the core file. IBM and WebSphere are trademarks of International Business Machines Corporation, registered in many jurisdictions worldwide.

Embodiments of the invention enable the data most likely to be relevant to a crash to be identified, that is, the areas of memory that would be most useful in diagnosing the problem. Such extracted core data will generally be many times smaller than the full set of core data in any given scenario. Following the program trace backwards from the last entry just before the crash, and gathering the graph of objects referenced by trace entries to a predetermined depth enables the gathering of the data that is highly likely to have been implicated in the crash. Furthermore, the data extracted from the registers is likely to be the most recently accessed data relative to the data referenced in the trace data entries.

As will be understood by those skilled in the art, the core data, trace data or extracted/identified core data may be stored in any suitable manner and not limited to a single file.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, radio frequency or any suitable combination of the foregoing.

Computer program code for carrying out operations for aspects of the present invention may be written in any combination of one or more programming languages, including an object oriented programming language such as Java™, Smalltalk™, C++™ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java™ and all Java™-based trademarks and logos are trademarks or registered trademarks of Oracle™ and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the scope of applicant's general inventive concept.

The invention claimed is:

1. A method for processing core data produced by a computer process to identify data relevant to the computer process, the method comprising:
    identifying the core data for a computer process;
    identifying trace data comprising sequential trace entries for the computer process;
    selecting a predetermined number of most recent entries in the trace data;
    identifying any references to a memory address in each selected trace data entry;
    dereferencing each identified memory address in the core data;
    extracting the data from the dereferenced memory location in the core data;
    in response to the data from any dereferenced memory location in the core data comprising a further reference to a memory address, dereferencing the further memory address in the core data; and
    extracting the data from the dereferenced further memory location in the core data,
    wherein, for a given trace entry, the extraction of referenced data is limited to a predetermined depth of reference.

2. The method of claim 1 wherein the most recent entries in the trace data comprise a predetermined number of entries.

3. The method of claim 1 wherein the extracted data comprises a data structure.

4. The method of claim 1 wherein each reference to a memory address comprises a pointer.

5. The method of claim 1 further comprising:
    identifying entries in the core data comprising register data for the process;
    identifying any references to a memory address in each selected register entry;
    dereferencing each identified register entry memory address in the core data; and
    extracting the data from the dereferenced register entry memory location in the core data.

6. The method of claim 1 wherein the extracted data is marked within the core data file.

7. The method of claim 1 wherein remaining data in the core data file excluding the extracted data is replaced with compressible data.

8. The method of claim 1 wherein the extracted data is copied from the core data file into one or more other files.

9. The method of claim 1 wherein the computer process is a system or application program, and the method further comprises:
    translating references to memory addresses in the trace data for program to the core data address space so as to enable:
    identifying any references to a memory address in each selected trace data entry;
    dereferencing each identified memory address in the core data; and
    extracting the data from the dereferenced memory location in the core data.

10. The method of claim 1 wherein the computer process is a virtual machine.

11. An apparatus for processing core data produced by a computer process to identify data relevant to the computer process, the apparatus comprising:
    a processor; and
    a memory including program code configured to be executed by the processor to cause the apparatus to:
    identify the core data for a computer process;
    identify trace data comprising sequential trace entries for the computer process;
    select a predetermined number of most recent entries in the trace data;
    identify any references to a memory address in each selected trace data entry;
    dereference each identified memory address in the core data;
    extract the data from the dereferenced memory location in the core data;
    responsive to the data from any dereferenced memory location in the core data comprising a further reference to a memory address, to dereference the further memory address in the core data; and
    to extract the data from the dereferenced further memory location in the core data,
    wherein, for a given trace entry, the extraction of referenced data is limited to a predetermined depth of reference.

12. The apparatus of claim 11 wherein the most recent entries in the trace data comprise a predetermined number of entries.

13. The apparatus of claim 11 wherein the extracted data comprises a data structure.

14. The apparatus of claim 11 wherein each reference to a memory address comprises a pointer.

15. The apparatus of claim 11 wherein the apparatus is further operable to:
    identify entries in the core data comprising register data for the process;
    identify any references to a memory address in each selected register entry;
    dereference each identified register entry memory address in the core data; and
    extract the data from the dereferenced register entry memory location in the core data.

16. The apparatus of claim 11 wherein the extracted data is marked within the core data file.

17. An apparatus for processing core data produced by a computer process to identify data relevant to the computer process, the apparatus comprising:
    a processor; and
    a memory including program code configured to be executed by the processor to cause the apparatus to:
    identify the core data for a computer process;
    identify trace data comprising sequential trace entries for the computer process;
    select a predetermined number of most recent entries in the trace data;
    identify any references to a memory address in each selected trace data entry;
    dereference each identified memory address in the core data; and
    extract the data from the dereferenced memory location in the core data, wherein remaining data in the core data file excluding the extracted data is replaced with compressible data.

18. The apparatus of claim 11 wherein the extracted data is copied from the core data file into one or more other files.

19. The apparatus of claim 11 wherein the computer process is a system or application program, and the apparatus is further operable to:
- translate references to memory addresses in the trace data for program to the core data address space so as to enable the apparatus to:
- identify any references to a memory address in each selected trace data entry;
- dereference each identified memory address in the core data; and
- extract the data from the dereferenced memory location in the core data.

20. The apparatus of claim 11 wherein the computer process is a virtual machine.

21. A computer program stored on a non-transitory computer readable medium and loadable into a memory of a digital computer, comprising software code portions, when said computer program is run on a computer, for performing the method of claim 1.

22. A computer program product for processing core data produced by a computer process to identify data relevant to the computer process, the computer program product comprising:
- a non-transitory computer readable storage medium having instructions stored thereon that are readable by a processing circuit and executable by the processing circuit for performing a method according to claim 1.

23. The apparatus of claim 17 wherein the most recent entries in the trace data comprise a predetermined number of entries.

24. The apparatus of claim 17 wherein the computer process is a system or application program, and the apparatus is further operable to:
- translate references to memory addresses in the trace data for program to the core data address space so as to enable the apparatus to:
- identify any references to a memory address in each selected trace data entry;
- dereference each identified memory address in the core data; and
- extract the data from the dereferenced memory location in the core data.

25. The apparatus of claim 17 wherein the apparatus is further operable to:
- identify entries in the core data comprising register data for the process;
- identify any references to a memory address in each selected register entry;
- dereference each identified register entry memory address in the core data; and
- extract the data from the dereferenced register entry memory location in the core data.

26. The apparatus of claim 17 wherein the computer process is a virtual machine.

* * * * *